UNITED STATES PATENT OFFICE.

WILLIAM D. RICHARDSON, OF CHICAGO, ILLINOIS.

PROCESS OF MAKING METALLIC CATALYZERS.

1,257,396.  Specification of Letters Patent.  Patented Feb. 26, 1918.

No Drawing.   Application filed November 11, 1912.  Serial No. 730,745.

*To all whom it may concern:*

Be it known that I, WILLIAM D. RICHARDSON, a citizen of the United States of America, and a resident of Chicago, county of Cook, and State of Illinois, have invented certain new and useful Improvements in Processes of Making Metallic Catalyzers, of which the following is a specification.

The object of this invention is to facilitate the manufacture of, and produce an improved metallic catalyzer particularly adapted for use in processes of hydrogenating oils and fats to harden or solidify them. As is well known, fatty oils, oleic acid, etc., can be hardened and converted into fatty bodies of higher melting point by treatment with gaseous hydrogen in the presence of certain catalytically acting bodies; nickel being generally used. Under the influence of the catalyst the hydrogen is taken up chemically by the oil, oleic acid being converted into stearic and olein into stearin. Nothing definite however is known as to the nature of the actions taking place; but it is known that the character of the catalyst and the manner of its manufacture have much influence on the result.

In the present invention I have devised a new method of preparing highly reactive catalysts with the production of a permanent material which can be readily incorporated with oils and fats to be treated without danger of injury by air.

This object is accomplished by the following described process:

I first put in a suitable container a quantity of a fluent organic substance, preferably in liquid or semi-liquid form, and of a kind adapted to mix with or having an affinity for oil or fat. This substance, for example, may be oil or fat. Advantageously it is an oil or fat of such a nature as to mingle harmlessly with the oil later to be hydrogenated. It should not be very volatile as the heat of the arc would dissipate it and as this would cause inconvenience in handling the preparation subsequently. Access to air is harmful to catalysts used for hydrogenating oils. Two metallic pole pieces are then submerged in this substance and connected with a suitable device for supplying an electric current through said pieces. These pieces serve as electrodes, being suitably spaced apart to produce an electric arc across the gap between them, and to cause part of the metal of said electrodes to disintegrate and become suspended in the said organic substance. The electrodes suitable for this purpose may be nickel, copper, platinum, palladium, iron, or their alloys, or other metals or alloys. These electrodes may be conveniently used in the form of rods, and the electric current may be supplied by a hand feed or by an automatic arc lamp mechanism in which the rods are clamped. They may be entirely or partly submerged in the organic substance before mentioned, with their submerged ends in suitable proximity to each other to form the electric arc. The electric current is operated preferably at a voltage of from 40 to 150, and is preferably a direct current.

The disintegration of the metals under the influence of the current is indicated to the eye by the blackening of the liquid caused by the diffusing or spreading of the metallic particles through it in forming the colloidal solution or suspension.

During the operation of the arc, gases and heat are generated and in order to minimize the effect of these I agitate the liquid and cool it by any suitable means.

The arc is allowed to continue until the organic substance forming the vehicle for the disintegrated metal contains the desired amount of said disintegrated metal as, for example, from 1 to 20 per cent. of its weight. This proportion may be widely varied, depending upon the strength of the catalyzer desired. In hydrogenating an oil, other things being equal, the action goes on the quicker the greater the amount of catalytic metal present. By the present method, a catalyst can be prepared containing any desired amount of active metal in a given amount of a carrier, thus rendering easy the addition of adjusted amounts of catalyzer to oil to be hydrogenated. Where an oil or fat is used as the organic body or vehicle for the metal, the preparation thus produced may be directly added to the oil to be hydrogenated.

Nickel electrically disintegrated or colloidalized beneath oil or fat gives an active permanent preparation which can be conveniently handled, stored and kept and which can be easily added to and uniformly diffused through oil to be hydrogenated.

When an oil or fat is used as the vehicle the catalyzer is complete for use as soon as the desired amount of metal has become disintegrated and mixed therein.

The catalyzer preparations produced by the process herein described, may be used for hydrogenating oils or fats in any of well known processes, as by mixing them with such oil and treating the oil with hydrogen or gases containing hydrogen, under heat and pressure.

What I claim as my invention and desire to secure by Letters Patent is—

1. The process of forming a catalyzer adapted for use in the hardening of fatty oils which consists in producing an electric arc between two metallic electrodes submerged in fluent fatty mass and thereby disintegrating part of the metal and causing it to enter the fat in finely divided form.

2. The process of forming a catalyzer adapted for use in the hardening of fatty oils which consists in producing an electric arc between two metallic electrodes submerged in a liquid or semi-liquid organic body of a fatty nature and thereby disintegrating part of the metal and causing it to enter said body in finely divided or colloidal suspension and stirring the mass so as to diffuse said disintegrated metal throughout said body.

3. The process of forming a catalyzer adapted for use in the hardening of fatty oils which consists in producing an electric arc between two metallic electrodes submerged in a liquid or semi-liquid organic body of fatty nature, and permitting the electric current to thus act on the metal until from 1 to 20 per cent. thereof has become disintegrated, and stirring the mass so as to diffuse said disintegrated metal throughout said body.

4. The process of forming a catalyzer adapted for use in the hardening of fatty oils which comprises producing an electric arc between nickel electrodes in a fluent fatty mass, such arc being continued until such mass contains a substantial proportion of disintegrated nickel.

5. As a new article of manufacture, a permanent catalyst consisting of a suspension of electrically disintegrated colloidal metal in a fluent fatty substance.

6. As a new article of manufacture, a permanent catalyst consisting of a suspension of electrically disintegrated colloidal nickel in a fluent fatty substance.

7. As a new article of manufacture, a permanent catalyst consisting of a suspension of electrically disintegrated metal in a fluent fatty substance.

8. As a new article of manufacture, a permanent catalyst consisting of a suspension of electrically disintegrated nickel in a fluent fatty substance.

Signed at Chicago this 25 day of October 1912.

WILLIAM D. RICHARDSON.

Witnesses:
I. O. BEATTY,
ARTHUR CORBISHLEY.